United States Patent
Barbu et al.

(10) Patent No.: US 12,519,553 B2
(45) Date of Patent: Jan. 6, 2026

(54) RADIO DETECTOR

(71) Applicant: Nokia Technologies Oy, Espoo (FI)

(72) Inventors: Oana-Elena Barbu, Aalborg (DK);
Benny Vejlgaard, Aalborg (DK);
Hannu Pekka Kauppinen, Espoo (FI);
Johannes Harrebek, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 389 days.

(21) Appl. No.: 18/345,344

(22) Filed: Jun. 30, 2023

(65) Prior Publication Data

US 2024/0022341 A1    Jan. 18, 2024

(30) Foreign Application Priority Data

Jul. 14, 2022   (EP) ..................................... 22184950

(51) Int. Cl.
*H04B 17/318*    (2015.01)

(52) U.S. Cl.
CPC .................................. *H04B 17/318* (2015.01)

(58) Field of Classification Search
CPC ... H04B 17/318; H04B 17/382; H02J 50/001; H04W 52/0251; H04W 52/0296
See application file for complete search history.

(56) References Cited

U.S. PATENT DOCUMENTS

| | | |
|---|---|---|
| 8,258,955 B1 | 9/2012 | Hyde et al. |
| 2003/0137403 A1 | 7/2003 | Carrender et al. |
| 2007/0206705 A1 | 9/2007 | Stewart |
| 2010/0060432 A1 | 3/2010 | van Niekerk et al. |
| 2011/0285511 A1 | 11/2011 | Maguire et al. |

(Continued)

FOREIGN PATENT DOCUMENTS

| | | |
|---|---|---|
| CN | 105723684 B | 3/2019 |
| TW | I530120 B | 4/2016 |
| WO | 2021/154610 A1 | 8/2021 |

OTHER PUBLICATIONS

"3rd Generation Partnership Project; Technical Specification Group Radio Access Network; NR; Physical channels and modulation (Release 17)", 3GPP TS 38.211, V17.1.0, Mar. 2022, pp. 1-135.

(Continued)

*Primary Examiner* — Junpeng Chen
(74) *Attorney, Agent, or Firm* — Nokia Technologies Oy (57) ABSTRACT

An apparatus, method and computer program is described comprising: determining, using a first passive module, whether one or more of a first plurality of frequency ranges is occupied, wherein each of the first plurality of frequency ranges has one of a first set of one or more bandwidths; determining, using a second passive module, whether one or more of a second plurality of frequency ranges is occupied, wherein each of the second plurality of frequency ranges has one of a second set of one or more bandwidths, and wherein a smallest bandwidth amongst the second set of bandwidths is larger than a largest bandwidth amongst the first set of bandwidths; and triggering an active module in the event that one or more of the first plurality of frequency ranges is determined to be occupied and none of said second plurality of frequency ranges is determined to be occupied, wherein the active module comprises a radio detector for detecting a target waveform.

20 Claims, 4 Drawing Sheets

(56) References Cited

U.S. PATENT DOCUMENTS

| | | | |
|---|---|---|---|
| 2013/0273957 A1* | 10/2013 | McHenry | H04W 72/0446 |
| | | | 455/509 |
| 2015/0257006 A1 | 9/2015 | Mashhadi et al. | |
| 2018/0191450 A1* | 7/2018 | Porat | H04B 17/318 |
| 2020/0045667 A1 | 2/2020 | Modarres Razavi et al. | |
| 2020/0053690 A1 | 2/2020 | Fischer et al. | |
| 2020/0113654 A1* | 4/2020 | Akselrod | A61B 5/0534 |
| 2022/0065979 A1 | 3/2022 | Bao et al. | |
| 2022/0070712 A1 | 3/2022 | Bao et al. | |

OTHER PUBLICATIONS

"3rd Generation Partnership Project; Technical Specification Group Radio Access Network; NR; Physical layer procedures for data (Release 17)", 3GPP TS 38.214, V17.1.0, Mar. 2022, pp. 1-225.

"3rd Generation Partnership Project; Technical Specification Group Radio Access Network; NR; Physical layer procedures for control (Release 17)", 3GPP TS 38.213, V17.1.0, Mar. 2022, pp. 1-245.

PCT Application No. PCT/EP2022/069702, "Positioning", filed on Jul. 14, 2022, pp. 1-27.

"Moderator's summary of Discussion [RAN94e-R18Prep-28] Passive IoT", 3GPP TSG RAN#94e, RP-212688, Agenda: 8A.5, Ericsson, Dec. 6-17, 2021, pp. 1-45.

Tang et al., "Self-Sustainable Long-Range Backscattering Communication Using RF Energy Harvesting", IEEE Internet of Things Journal, vol. 8, No. 17, Sep. 1, 2021, pp. 13737-13749.

Lin et al., "Battery-Less IoT Sensor Node with PLL-Less WiFi Backscattering Communications in a 2.5-µW Peak Power Envelope", Symposium on VLSI Circuits, Jun. 13-19, 2021, pp. 1-2.

Chen et al., "Reliable and Practical Bluetooth Backscatter With Commodity Devices", IEEE/ACM Transactions on Networking, vol. 29, No. 4, Aug. 2021, pp. 1717-1729.

Lyu et al., "A UHF/UWB Hybrid RFID Tag With a 51-m Energy-Harvesting Sensitivity for Remote Vital-Sign Monitoring", IEEE Transactions on Microwave Theory and Techniques, vol. 68, No. 11, Nov. 2020, pp. 4886-4895.

Han et al., "A 920-MHz Dual-Mode Receiver with Energy Harvesting for UHF RFID Tag and IoT", Electronics, vol. 9. No. 6, 2020, pp. 1-14.

Kanhere et al., "Position Location for Futuristic Cellular Communications: 5G and Beyond", IEEE Communications Magazine, vol. 59, No. 1, Jan. 2021, pp. 70-75.

Liu et al., "Ambient Backscatter Communication-based Smart 5G IoT Network", EURASIP Journal on Wireless Communications and Networking, Article No. 34, 2021, pp. 1-19.

Extended European Search Report received for corresponding European Patent Application No. 22184950.8, dated Jan. 5, 2023, 7 pages.

* cited by examiner

RADIO DETECTOR

RELATED APPLICATION

This application claims priority to the European patent application number 22184950.8, filed on Jul. 14, 2022, the content of which is incorporated herein by reference in its entirety.

FIELD

The present specification relates to a radio detector. For example, the specification describes a radio detector as part of a passive device discovery, identification and/or positioning system.

BACKGROUND

The use of backscatter signals for communications with a passive device is known. Such signals can be used, for example, to obtain an identifier of a passive device. There remains a need for further developments in this field.

SUMMARY

In a first aspect, this specification describes an apparatus comprising means for performing: determining, using a first passive module, whether one or more of a first plurality of frequency ranges is occupied, wherein each of the power has one of a first set of one or more bandwidths (each frequency-bandwidth pair may relate to a "tag region" in which tags operate); determining, using a second passive module, whether one or more of a second plurality of frequency ranges is occupied, wherein each of the second plurality of frequency ranges has one of a second set of one or more bandwidths, and wherein a smallest bandwidth amongst the second set of bandwidths is larger than a largest bandwidth amongst the first set of bandwidths; and triggering an active module in the event that one or more of the first plurality of frequency ranges is determined to be occupied and none of said second plurality of frequency ranges is determined to be occupied, wherein the active module comprises a radio detector for detecting a target waveform (such as an envelope detector based on tag ID). The apparatus may be a mobile communication device (such as a 5G UE).

The apparatus may be a hybrid reader having two passive radio detectors and an active radio detector, wherein the active radio detector is triggered dependent on the output of the passive radio detectors, thereby preventing energy-hungry active radio detectors from being activated too often.

The means for determining whether one or more of the first plurality of frequency ranges is occupied may further comprise means for performing: determining whether a power level (e.g. power spectral density (PSD)) of a received signal in each of the first plurality of frequency ranges is above a first threshold level, such that the respective frequency range is determined to be occupied. The means for determining whether one or more of a second plurality of frequency ranges is occupied may further comprise means for performing: determining whether a power level (e.g. power spectral density (PSD)) of the received signal in each of the second plurality of frequency ranges is above a second threshold level, such that the respective frequency range is determined to be occupied. The said active module may be triggered in the event that the power within any of the first frequency ranges has a power level above the first threshold and none of the second frequency ranges has a power level above the second threshold level, wherein the active module comprises a radio detector for detecting a target waveform.

The first passive module may comprise a first energy harvesting module. The first passive module may not have any other source of electrical power. The second passive module may comprise a second energy harvesting module. The second passive module may not have any other source of electrical power.

The first set of frequency and bandwidth pairs may correspond to tag communication frequencies (e.g. so-called "tag frequencies") of expected tag communications.

The second set of bandwidths may comprise a minimum bandwidth available for allocation to unlicensed communications (e.g. unlicensed 3GPP communications).

Some example embodiments further comprise a control module for triggering said active module. The active module may be triggered if the first passive module outputs an occupied signal and the second passive module does not output an occupied signal.

The active module may comprise a tag reader. For example, the active module may comprise a tag detector module that determines identifiers of any tags having backscatter signals that have been detected. The active module may comprise means for performing: decoding one or more other payload(s) carried by said backscatter signals.

The first set of bandwidths may comprise a plurality of bandwidths. The second set of bandwidths may comprises a plurality of bandwidths.

In some example embodiments, the first and second frequency ranges are the same.

The first and second frequency ranges may be within an unlicensed 3GPP spectrum.

The first and/or the second frequency ranges may have predefined sets of frequencies and bandwidths.

In a second aspect, this specification describes a method comprising: determining whether one or more of a first plurality of frequency ranges is occupied, wherein each of the first plurality of frequency ranges has one of a first set of one or more bandwidths; determining whether one or more of a second plurality of frequency ranges is occupied, wherein each of the second plurality of frequency ranges has one of a second set of one or more bandwidths, and wherein a smallest bandwidth amongst the second set of bandwidths is larger than a largest bandwidth amongst the first set of bandwidths; and triggering an active module in the event that one or more of the first plurality of frequency ranges is determined to be occupied and none of said second plurality of frequency ranges is determined to be occupied, wherein the active module comprises a radio detector for detecting a target waveform.

Determining whether one or more of the first plurality of frequency ranges is occupied may further comprise: determining whether a power level (e.g. power spectral density (PSD)) of a received signal in each of the first plurality of frequency ranges is above a first threshold level, such that the respective frequency range is determined to be occupied. Determining whether one or more of a second plurality of frequency ranges is occupied further may further comprises: determining whether a power level (e.g. power spectral density (PSD)) of the received signal in each of the second plurality of frequency ranges is above a second threshold level, such that the respective frequency range is determined to be occupied. The said active module may be triggered in the event that the power within any of the first frequency ranges has a power level above the first threshold and none of the second frequency ranges has a power level above the second threshold level, wherein the active module comprises a radio detector for detecting a target waveform.

The active module may be triggered if the first passive module outputs an occupied signal and the second passive module does not output an occupied signal.

The active module may comprise a tag detector module that determines identifiers of any tags having backscatter signals that have been detected. The active module may decode one or more other payload(s) carried by said backscatter signals.

In a third aspect, this specification describes computer-readable instructions which, when executed by a computing apparatus, cause the computing apparatus to perform (at least) any method as described with reference to the second aspect.

In a fourth aspect, this specification describes a computer-readable medium (such as a non-transitory computer-readable medium) comprising program instructions stored thereon for performing (at least) any method as described with reference to the second aspect.

In a fifth aspect, this specification describes an apparatus comprising: at least one processor; and at least one memory including computer program code which, when executed by the at least one processor, causes the apparatus to perform (at least) any method as described with reference to the second aspect.

In a sixth aspect, this specification describes a computer program comprising instructions for causing an apparatus to perform at least the following: determining whether one or more of a first plurality of frequency ranges is occupied, wherein each of the first plurality of frequency ranges has one of a first set of one or more bandwidths; determining whether one or more of a second plurality of frequency ranges is occupied, wherein each of the second plurality of frequency ranges has one of a second set of one or more bandwidths, and wherein a smallest bandwidth amongst the second set of bandwidths is larger than a largest bandwidth amongst the first set of bandwidths; and triggering an active module in the event that one or more of the first plurality of frequency ranges is determined to be occupied and none of said second plurality of frequency ranges is determined to be occupied, wherein the active module comprises a radio detector for detecting a target waveform.

In a seventh aspect, this specification describes: a first passive module or reader (or some other means) for determining whether one or more of a first plurality of frequency ranges is occupied, wherein each of the first plurality of frequency ranges has one of a first set of one or more bandwidths; a second passive module or reader (or some other means) for determining whether one or more of a second plurality of frequency ranges is occupied, wherein each of the second plurality of frequency ranges has one of a second set of one or more bandwidths, and wherein a smallest bandwidth amongst the second set of bandwidths is larger than a largest bandwidth amongst the first set of bandwidths; and control module (or some other means) for triggering an active module in the event that one or more of the first plurality of frequency ranges is determined to be occupied and none of said second plurality of frequency ranges is determined to be occupied, wherein the active module comprises a radio detector for detecting a target waveform.

BRIEF DESCRIPTION OF THE DRAWINGS

Example embodiments will now be described, by way of example only, with reference to the following schematic drawings, in which.

DETAILED DESCRIPTION

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

The number of Internet of Things (IoT) connections is growing and, on some predictions, may be of the order of hundreds of billions by 2030. With more and more 'things' expected to be interconnected for purposes such as improving production efficiency and increasing comforts of life, further reduction of size, cost and power consumption for IoT devices are desired. In particular, regular replacement of batteries for many IoT devices is impractical due to the consumption of materials and manpower. One option is to use energy harvested from environments to power IoT devices for self-sustainable communications, especially in applications having a very large number of devices (such as ID tags and sensors).

Existing IoT devices often consume of the order of tens or hundreds of milliwatts of power during transceiver operations. However, to achieve the so-called "Internet of Everything", IoT devices with significantly lower power consumption may be required, especially for applications incorporating batteryless devices.

IoT devices may communicate using 3GPP technologies or non-3GPP technologies, as discussed further below.

An issue with existing 3GPP technologies for some use cases is the capability of cooperating with energy harvesting devices, considering limited device size. Cellular devices may consume tens or even hundreds of milliwatts power for transceiver processing. Taking narrowband IoT (NB-IoT) modules for example, an example current absorption for receive processing may be of the order of 60 mA with supply voltage higher than 3.1V, while 70 mA may be required for transmitting processing at 0 dBm transmit power. The output power provided by an example energy harvester may be less than 1 milliwatt, based on a device size of a few square centimetres. Since the available power may be less than the consumed power, it may be impractical to power cellular devices directly by energy harvesting in many cases.

One possible solution is to integrate energy harvesting with a rechargeable battery or supercapacitor. However, this raises further issues, some of which are outlined below.

First, both rechargeable batteries and supercapacitors may suffer from shortened lifetime in practical cases. It is hard to provide constant charging current or voltage by energy harvesting, while longtime continuous charging is needed due to the very small output power from a typical energy harvester. Variable charging current levels and extended continuous charging periods both tend to be harmful to battery life. For supercapacitors, lifetime may also be reduced in high temperature environments (e.g., less than 3 years at 50 degrees centigrade).

Second, device size may be significantly increased if a battery or supercapacitor is required. As a small size button battery can typically only provide current of a few tens of milliamps, a battery with much larger size (e.g., AA battery or larger) may be required to power cellular devices—such batteries may even be larger than the module itself. To store energy for a useful duration of working (such as one second), the required capacitance of a supercapacitor may be of the order of 100 mF. The size of such supercapacitors may be larger than an NB-IoT module.

Third, both rechargeable batteries and supercapacitors can be more expensive than the module itself. Even purchased in large quantities, the cost of a suitable battery or supercapacitor may reach one or a few dollars, which might double the overall cost of devices.

Regarding non-3GPP technologies, RFID is known for supporting batteryless tags/devices. The power consumption of commercial passive RFID tags can be as low as 1 microwatt. Techniques that help to enable such low power consumption are envelope detection for downlink data reception, and backscatter communication for uplink data transmission. RFID is designed for short-range communications, whose typical effective range is less than 10 meters.

In backscatter communications, a backscatter transmitter reflects a carrier wave sent by a reader and modifies one or more characteristics (e.g., amplitude, phase, or centre frequency) of the reflected signal according to information bits. By this means, data transmission can be implemented without the device itself needing to generate a carrier wave. Communication via reflection instead of by active radiation can reduce the RF frontend of the tag to a single transistor switch, thereby reducing manufacturing costs as well as energy demands.

Figure 1:
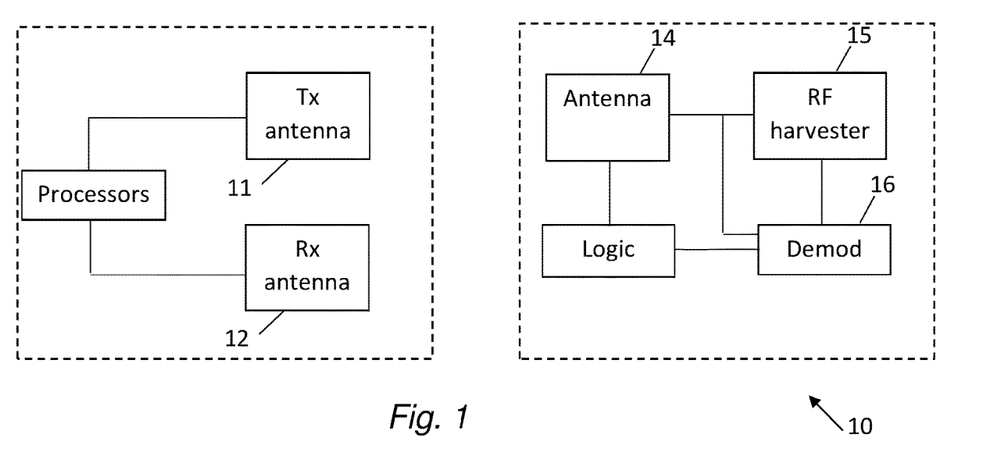
FIG. 1 is a block diagrams of a system in which example embodiments may be used.

FIG. 1 is a block diagram of a system, indicated generally by the reference numeral 10, in which example embodiments may be used. The system 10 includes a reader (on the left) and a tag (on the right). The reader includes, amongst other elements, a transmitting antenna 11 and a receiving antenna 12. The tag includes, amongst other elements, an antenna 14, an RF harvester 15 and a demodulator 16.

Figure 2:
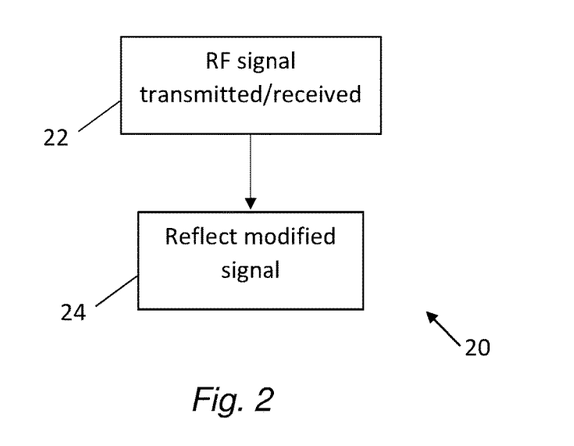
FIG. 2 is a flow chart showing an algorithm that may be implemented by the system of FIG. 1.

FIG. 2 is a flow chart showing an algorithm, indicated generally by the reference numeral 10, that may be implemented by the system 10 of FIG. 1.

The algorithm 20 starts at operation 22 where the transmitting antenna 11 is used to transmit a carrier wave that is received at the antenna 14 of the tag. The tag includes an RF harvester 15 that extracts power from the transmitted signal.

At operation 24, the carrier signal is modified at the tag (using the power extracted by the RF harvester 15) and the reflected modified signal is transmitted by the antenna 14 (and received by the receiving antenna 12 of the reader).

The system 10 may, for example, be used to encode the reflected signal generated at the operation 24 with a unique ID. In this way, for example, a reader device can determine which of multiple signals are original signals and which are reflected signals. Moreover, the ID can be used to enable the reader to identify the tag. Other uses of reflected/backscatter signals will be apparent to persons of ordinary skill in the art.

A problem with the use of backscattering for obtaining positioning data is that the link budget for passive IoT device is often limited (e.g. in many cases <50 meters). This may be acceptable for some Wi-Fi implementations, but can cause difficulty when cellular techniques, such as 5G New Radio (NR), are used.

For some use cases, it may be advantageous if a cellular (e.g. 5G NR) based tag discovery and identification solution could support world-wide tag discovery by any user device (e.g. any 5G UE) in proximity of the tag. This may enable global tag tracking by user devices detecting tag signals and loading detected tag IDs and approximate locations to a cloud database.

To keep complexity and cost low the tag discovery might be limited to single (or few) frequency bands and cannot be adjusted to the various local frequency bands around the world. Thus for a global passive IoT solution, a limited set of bands may be supported to keep cost at a minimum. Unlicensed spectrum such as 2.4 GHz or 5 GHz is one of the only options available for such global tag communications.

Two distinct types of tags may be considered: a full-duplex tag (FD_Tag) and a half-duplex tag (HD_Tag).

Figure 3:
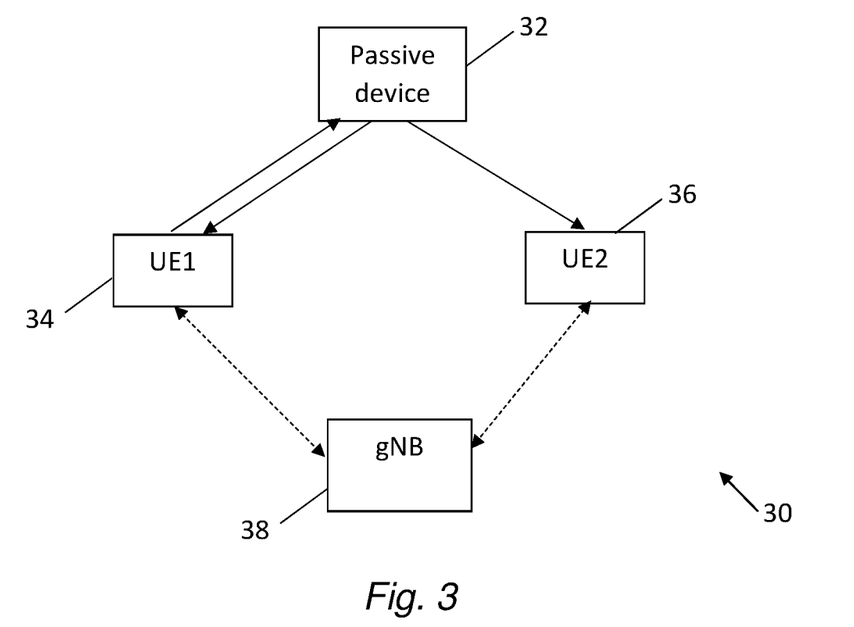
FIG. 3 to 5 are block diagrams of system in accordance with example embodiments.

FIG. 3 is a block diagram of a system, indicated generally by the reference numeral 30, in accordance with an example embodiment. The system 30 comprises a passive device/tag 32, a first user device 34, a second user device 36 and a communication node 38. The device 32 may be a full-duplex tag. The first and second user devices may be 5G NR UEs or some other mobile communication devices. The communication node 38 may be a gNB.

In the use of the system 30, a charging RF signal is transmitted by an activator unit, which, in this example, is the first user device 34. The tag 32 is a passive tag (e.g. a passive IoT device) that uses the RF signal as a charging signal to harvest enough energy to modulate the reflection of the activator signal with the ID sequence of the tag. As such, the tag 32 is not performing active transmission but simply modulates the reflection of the incoming RF activator signal, thereby providing a backscatter signal.

A tag reader unit incorporated within the first user device 34 and/or the second user device 36 receives and decodes the ID of the tag incorporated within the reflected activator signal. The respective readers only need to measure when the activator signal is ON. Both activator signal and tag reflection will arrive overlapping in time at the reader.

Figure 4:
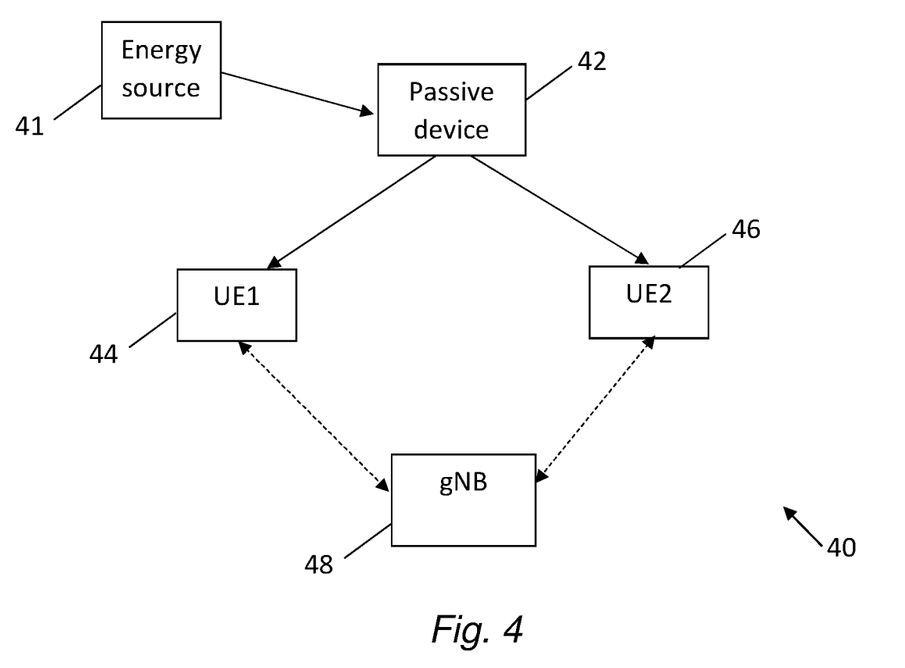

FIG. 4 is a block diagram of a system, indicated generally by the reference numeral 40, in accordance with an example embodiment. The system 40 comprises an energy source 41, a passive device/tag 42, a first user device 44, a second user device 46, a communication node 48. The device 42 may be a half-duplex tag. The first and second user devices may be 5G NR UEs (or some other mobile communication devices). The communication node 48 may be a gNB.

The system 40 differs from the system 30 in that the signal used by the passive device 42 to harvest energy is provided from the energy source 41 rather than one of the user devices.

The energy source may take many forms (e.g. photonic, thermal, piezoelectric, electromagnetic). The device 42 may transmit a tag identification signal ad-hoc or periodically whenever stored energy is above a certain threshold and potentially when the energy source 41 is turned OFF. The device 42 harvests energy from the energy source 41 and when enough energy is stored the tag transmits its ID.

The device 42 actively transmits an RF signal including the relevant identifier, thereby consuming the harvested energy. The reader (at one or more of the user devices 44 and 46) may be required to measure continuously due to the ad hoc nature of transmissions. The passive device 42 may be referred to as a semi-passive device.

Some practical implementations of the systems 30 and 40 described above (particular when operating in the unlicensed band) can result in unpredictable band usage which may trigger undesirable passive device detection attempts at a tag reader (e.g. at one of the user devices/UEs). False detections of passive devices can result in unnecessary draining of power resources at such devices.

Figure 5:
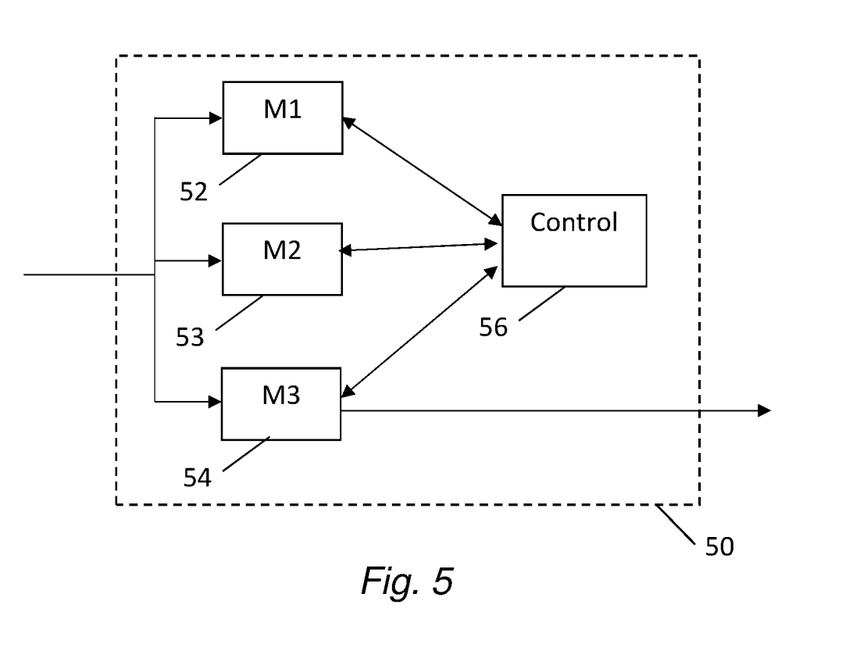

FIG. 5 is a block diagram of a system, indicated generally by the reference numeral 50, in accordance with an example embodiment. The system 50 comprises a first passive module 52, a second passive module 53, an active module 54 and a control module 56. The system 50 may be used as a reader of the systems 30 or 40 (e.g. as part of one of the first user devices 34 and 44 or one of the second user devices 36 and 46).

The first passive module 52 includes a first energy harvesting module (and may not have any other source of electrical power, such as a battery). Similarly, the second passive module 53 including a second energy harvesting module (and may not have any other source of electrical power, such as a battery).

The active module 54 may comprise a tag reader. Alternatively, or in addition, the active module 54 may comprise a tag detector module that determines identifiers of any tags having backscatter signals that have been detected.

As discussed further below, the system 50 can be used to implement a method of passive device (e.g. tag) detection in the unlicensed spectrum. Specifically, a hybrid reader is provided that can be used to detect and read the backscatter signal of any passive device (such as the passive devices 32 and 42 described above), where such backscatter signals are sent over the unlicensed spectrum and thus ensures that any passive device can be read, regardless of its ID. To avoid that the reader is activated by other unlicensed signals, a reader architecture consisting of two passive energy harvesting modules (e.g. the modules 52 and 53 of the system 50) which trigger under certain conditions and an active detector module (e.g. the module 54) that outputs the IDs of all detected tags.

In the system 50, the first passive module 52 may incorporate a first passive energy harvesting module M1 that listens to backscatter signals (sent by any unlicensed tag) with a bandwidth no larger than B1. In contrast, the second passive module 53 may incorporate a second passive energy harvesting module M2 that listens to unlicensed signals with a bandwidth B2>B1, where B2 is the minimal allocation for any other unlicensed traffic e.g. minimal SL unlicensed payload, WiFi or other communication devices.

The control module 56 is used to trigger the active module 54. Specifically, the control module 56 may trigger the active module 54 if both of the following conditions are met:
1. The first module M1 detects the one or more of a first plurality of channels is busy (e.g. occupied by an ongoing transmission). This could be implemented by detecting relevant energy levels, e.g. if the power spectral density (PSD) is larger than a threshold: PSD1>T where T is an implementation specific threshold; and
2. The second module M2 detects that one or more of a second plurality of channels is busy (e.g. occupied by an ongoing transmission). This could be implemented by detecting energy levels below a threshold level (e.g. negligible energy levels), e.g. PSD2<=T.

Condition 1 seeks to ensure that the reader becomes active only if it hears a signal sent by an unlicensed passive device, regardless of its ID. Condition 2 seeks to ensure that the reader does not wrongly wake-up and react due to other unlicensed traffic on full/partly overlapping resources.

When the reader is activated (e.g. due to fulfilling conditions 1 and 2 above), it triggers the active module 54 (the module M3) which determines the ID of all tags whose backscatter signals have been detected.

Figure 6:
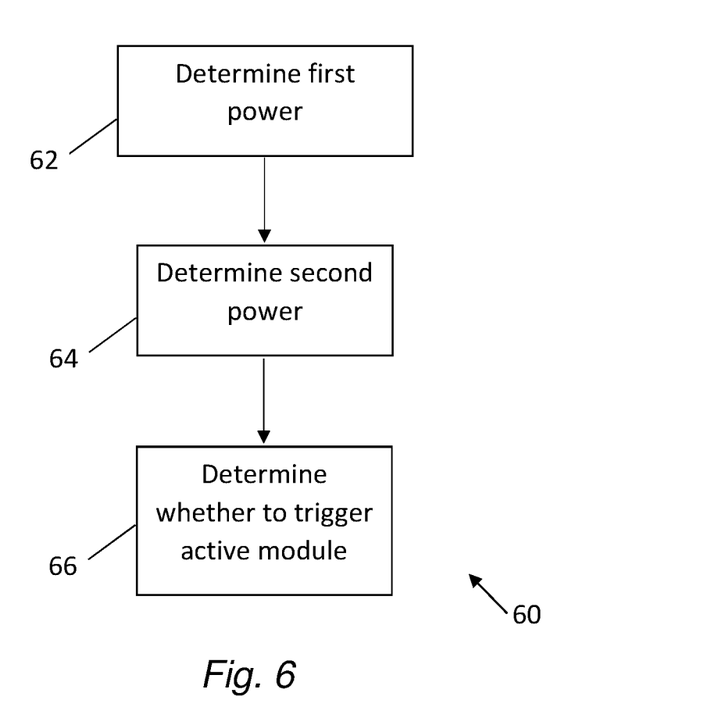
FIG. 6 is a flow chart showing an algorithm in accordance with an example embodiment.

FIG. 6 is a flow chart showing an algorithm, indicated generally by the reference numeral 60, in accordance with an example embodiment. The algorithm 60 may be implemented using the system 50 described above. Although the algorithm 60 has been described using power-based determination, alternative arrangements, such as envelope detection where the received signal is matched against different signatures of the transmitted signal, are possible.

At operation 62, a first power level (e.g. power spectral density) of a received signal in each of a first plurality of frequency ranges is determined using a first passive module (such as the first passive module 51 described above). A determination may be made regarding whether the detected power level in each of said frequency ranges is above a first threshold level. Thus, the operation 62 may determine whether the operation 1 discussed above is fulfilled.

In the operation 62, each of the first plurality of frequency ranges may have one of a first set of one or more bandwidths (e.g. one of a plurality of bandwidths). Thus, each of the first plurality of frequency ranges may comprise a frequency and bandwidth pair.

Indeed, a first set of frequency and bandwidth pairs may correspond to tag communication frequencies of expected tag communications (e.g. "tag regions" at which tags tend to operate).

At operation 64, a second power level (e.g. power spectral density) of the received signal in each of a second plurality of frequency ranges is determined using a second passive module (such as the second passive module 52 described above). A determination may be made regarding whether the detected power level in each of said frequency ranges in below a second threshold level. Thus, the operation 64 may determine whether the operation 2 discussed above is fulfilled.

In the operation 64, the second set of bandwidths comprises a minimum bandwidth available for allocation to unlicensed communications. The second set of bandwidths may comprise a plurality of bandwidths.

The first and/or the second frequency range may have a predefined sets of frequencies and bandwidths. Indeed, the first and second frequency ranges may be the same.

At operation 66, a determination is made regarding whether to trigger an active module (such as the active module 53 described above). The active module may be triggered in the event that the power within any of the first frequency ranges has a power level above the first threshold and none of the second frequency ranges has a power level below the second threshold level, wherein the active module comprises a radio detector.

By way of example, further details of the blocks of the system 50 in accordance with an example implementation are described in further detail below.

The first passive module 52 (the module M1) may be implemented by means of passive radio to act as a frequency selective energy detector for a known set of frequencies F={f1, f2, . . . } and bandwidths B={b1, b2, . . . }. The spectral regions given by the combinations {F, B} may be tag regions where the tags operate, i.e., where the tags send narrowband signals to advertise their presence. The module M1 may monitor the tag regions by collecting energy from each tag region or from known active tag regions in the area. Whenever the cumulated energy reaches a given threshold, a flag may be raised indicating that said region is associated with high probability of tag activity. The module M1 may implement a circuitry that behaves according to the following set of operations:

$O_1 = 0$

For $k = 1:K$

For $j = 1:J$

If $PSD(f_k, b_j) > T_1$ then $O_1 = 1$

Endfor

Endfor

The second passive module 53 (the module M2) may also be implemented by passive radio elements to act as an energy detector for the same set of frequencies F, but for a set of bandwidths G={g1, g2, . . . } where the set of bandwidths G are associated with all other unlicensed transmission, and where min{G}>max{B}, i.e. the smallest BW of any unlicensed transmission (by an active radio) is larger than the largest band of a tag's signal. The module M2 may implement a circuitry that behaves according to the following set of operations:

$o_2 = 0$

For $k = 1:K$

For $l = 1:l$

If $PSD(f_k, g_l) > T_1$ then $O_2 = 1$

Endfor

Endfor

The active module 54 (the module M3) may be triggered only when M1 detects a potential tag activity and M2 rules out the possibility of other unlicensed traffic happening in an overlapping band, i.e. an M3 activation flag is produced:

$O_3=1$ if $(o_1=1)$ AND $(o_2=0)$.

As a result of activating the active module 54, tag identification may be triggered for all pairs {fk, bj} for which o1=1.

The tag identification may be realized by various means:
If the signal generated by the tag is a raw signal (i.e. no payload), then the tag detection may be implemented by means of pattern matching e.g. cross-correlating the received signal with a locally generated tag signal using all tag IDs stored at M3.
If the signal generated by the tag is a NFC-like signal (i.e. the payload is encoded and modulated, with a known MCS, and the payload contains the tag ID), then the M3 detection may consist of equalization, demodulation and decoding. Once the decoding is finalized, the encoded bits are used to reconstruct the tag ID.

The principles described herein are also applicable to non-cellular devices e.g., WiFi.

Figure 7:
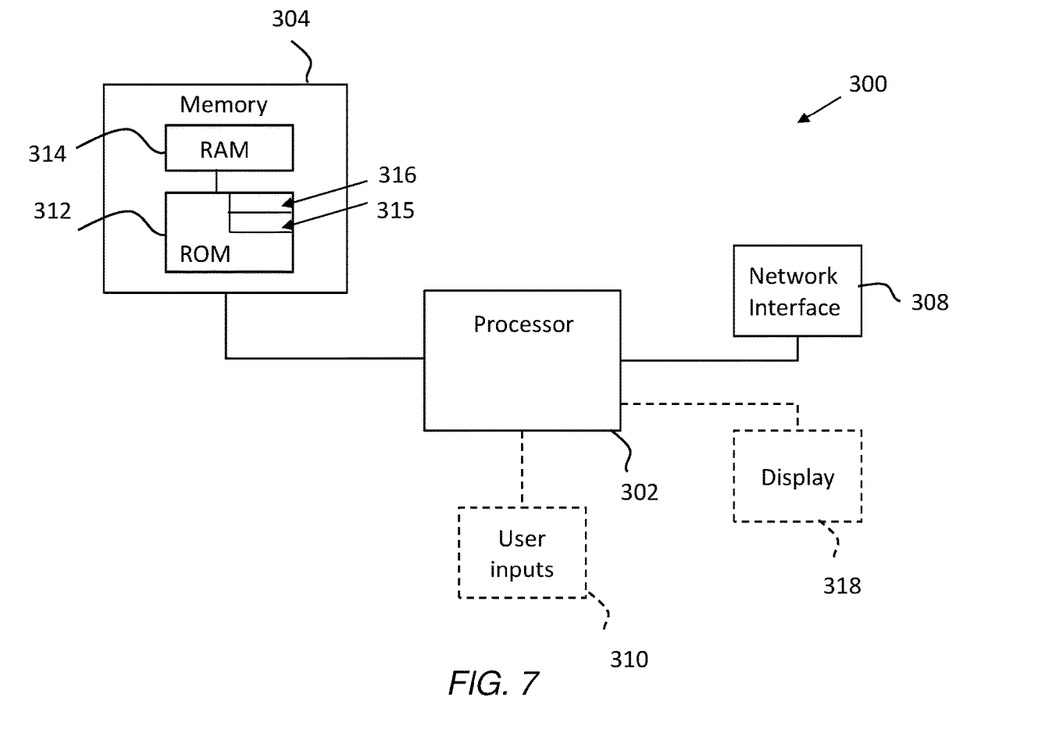
FIG. 7 is a block diagram of components of a system in accordance with an example embodiment.

For completeness, FIG. 7 is a schematic diagram of components of one or more of the example embodiments described previously, which hereafter are referred to generically as a processing system 300. The processing system 300 may, for example, be (or may include) the apparatus referred to in the claims below.

The processing system 300 may have a processor 302, a memory 304 coupled to the processor and comprised of a random access memory (RAM) 314 and a read only memory (ROM) 312, and, optionally, a user input 310 and a display 318. The processing system 300 may comprise one or more network/apparatus interfaces 308 for connection to a network/apparatus, e.g. a modem which may be wired or wireless.

The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the methods and algorithms 20 and 60 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 8:
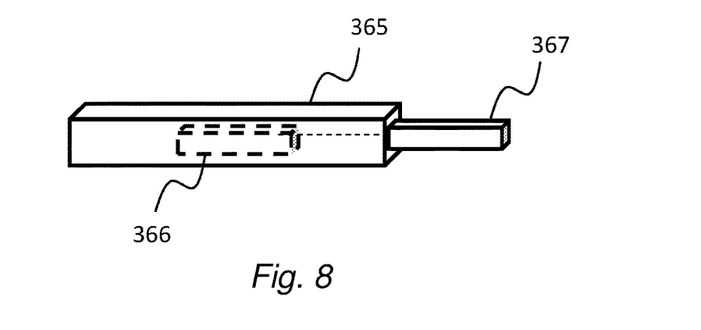
FIG. 8 shows an example of tangible media for storing computer-readable code which when run by a computer may perform methods according to example embodiments described above.

FIG. 8 shows tangible media, specifically a removable memory unit 365, storing computer-readable code which when run by a computer may perform methods according to example embodiments described above. The removable memory unit 365 may be a memory stick, e.g. a USB memory stick, having internal memory 366 for storing the computer-readable code. The internal memory 366 may be accessed by a computer system via a connector 367. Other forms of tangible storage media may be used. Tangible media can be any device/apparatus capable of storing data/ information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2 and 6 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
at least one processor and at least one memory storing instructions that, when executed by the at least one processor, cause the apparatus at least to:
determine, using a first passive module comprising an energy harvester, whether one or more of a first plurality of frequency ranges is occupied, wherein each of the first plurality of frequency ranges has at least one of a first set of one or more bandwidths;
determine, using a second passive module comprising an energy harvester, whether one or more of a second plurality of frequency ranges is occupied, wherein each of the second plurality of frequency ranges has at least one of a second set of one or more bandwidths, and wherein a smallest bandwidth amongst the second set of bandwidths is larger than a largest bandwidth amongst the first set of bandwidths; and
trigger an active module in the event that one or more of the first plurality of frequency ranges is determined to be occupied and none of said second plurality of frequency ranges is determined to be occupied, wherein the active module comprises a radio detector for detecting a target waveform.

2. The apparatus as claimed in claim 1 wherein for determining whether one or more of the first plurality of frequency ranges is occupied, the apparatus is further configured to determine whether a power level of a received signal in each of the first plurality of frequency ranges is above a first threshold level, such that the respective frequency range is determined to be occupied; and
for determining whether one or more of a second plurality of frequency ranges is occupied, the apparatus is further configured to determine whether a power level of the received signal in each one of the second plurality of frequency ranges is above a second threshold level, such that the respective frequency range is determined to be occupied,
wherein the active module is triggered in the event that the power within any of the first frequency ranges has a power level above the first threshold and none of the second frequency ranges has a power level above the second threshold level, wherein the active module comprises a radio detector for detecting a target waveform.

3. The apparatus as claimed in claim 1, wherein the first passive module comprises at least a first energy harvesting module, or the second passive module comprises at least a second energy harvesting module.

4. The apparatus as claimed in claim 1, wherein the first set of frequency and bandwidth pairs correspond to tag communication frequencies at which tags operate.

5. The apparatus as claimed in claim 1, wherein the second set of bandwidths comprises a minimum bandwidth available for allocation to unlicensed communications.

6. The apparatus as claimed in claim 1, wherein said apparatus comprises a control module for triggering said active module.

7. The apparatus as claimed in claim 1, wherein the active module comprises a tag reader.

8. The apparatus as claimed in claim 1, wherein said active module comprises a tag detector that determines an identifier of a tag having a backscatter signal having been detected.

9. The apparatus as claimed in claim 1, wherein:
the first set of bandwidths comprises a plurality of bandwidths; or
the second set of bandwidths comprises a plurality of bandwidths.

10. The apparatus as claimed in claim 1, wherein the first frequency range and the second frequency range are the same.

11. The apparatus as claimed in claim 1, wherein the first frequency range and the second frequency range are within an unlicensed 3GPP spectrum.

12. The apparatus as claimed in claim 1, wherein at least one of the first frequency range or the second frequency range each have a respective set of frequencies and bandwidths.

13. The apparatus as claimed in claim 1, wherein the apparatus is a mobile communication device.

14. A method comprising:
determining whether one or more of a first plurality of frequency ranges is occupied, wherein each of the first plurality of frequency ranges has at least one of a first set of one or more bandwidths;
determining whether one or more of a second plurality of frequency ranges is occupied, wherein each of the second plurality of frequency ranges has at least one of a second set of one or more bandwidths, and wherein a smallest bandwidth amongst the second set of bandwidths is larger than a largest bandwidth amongst the first set of bandwidths; and
triggering an active module in the event that one or more of the first plurality of frequency ranges is determined to be occupied and none of said second plurality of frequency ranges is determined to be occupied, wherein the active module comprises a radio detector for detecting a target waveform.

15. The method according to claim 14, wherein:
determining whether one or more of the first plurality of frequency ranges is occupied, further comprises determining whether a power level of a received signal in at least one of the first plurality of frequency ranges is above a first threshold level, such that the respective frequency range is determined to be occupied; and
determining whether one or more of a second plurality of frequency ranges is occupied, further comprises determining whether a power level of the received signal in at least one of the second plurality of frequency ranges is above a second threshold level, such that the respective frequency range is determined to be occupied,
wherein the active module is triggered in the event that the power within any of the first frequency ranges has a power level above the first threshold and none of the second frequency ranges has a power level above the second threshold level, wherein the active module comprises a radio detector for detecting a target waveform.

16. The method according to claim 14 wherein
the first passive module comprises at least a first energy harvesting module or,
the second passive module comprises at least a second energy harvesting module.

17. The method according to claim 14, wherein the first set of frequency and bandwidth pairs correspond to tag communication frequencies at which tags operate.

18. The method according to claim 14, wherein the active module comprises a tag reader.

19. The method according to claim 14, wherein said active module comprises a tag detector module that determines an identifier of a tag having a backscatter signal having been detected.

20. A non-transitory computer readable medium comprising program instructions that, when executed by an apparatus, cause the apparatus to perform at least the following:
determining whether one or more of a first plurality of frequency ranges is occupied, wherein each of the first plurality of frequency ranges has at least one of a first set of one or more bandwidths;
determining whether one or more of a second plurality of frequency ranges is occupied, wherein each of the second plurality of frequency ranges has at least one of a second set of one or more bandwidths, and wherein a smallest bandwidth amongst the second set of bandwidths is larger than a largest bandwidth amongst the first set of bandwidths; and
triggering an active module in the event that one or more of the first plurality of frequency ranges is determined to be occupied and none of said second plurality of frequency ranges is determined to be occupied, wherein the active module comprises a radio detector for detecting a target waveform.

* * * * *